United States Patent
Cheung et al.

(10) Patent No.: US 7,450,617 B2
(45) Date of Patent: Nov. 11, 2008

(54) SYSTEM AND METHOD FOR DEMULTIPLEXING VIDEO SIGNALS

(75) Inventors: Francis Cheung, Del Mar, CA (US);
Iue-Shuenn Chen, San Diego, CA (US);
Ut Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1012 days.

(21) Appl. No.: 10/640,682

(22) Filed: Aug. 14, 2003

(65) Prior Publication Data

US 2005/0036515 A1    Feb. 17, 2005

(51) Int. Cl.
*H04J 3/04* (2006.01)
(52) U.S. Cl. .............................. 370/536; 370/542
(58) Field of Classification Search .......... 370/532–544,
370/347–348; 348/14.01–14.02, 156, 385.1,
348/388.1, 394.1; 345/637–638
See application file for complete search history.

(56) References Cited

U.S. PATENT DOCUMENTS 5,708,961 A * 1/1998 Hylton et al. ................. 725/81
6,275,507 B1 * 8/2001 Anderson et al. ............ 370/487
7,230,987 B2 * 6/2007 Demas et al. ............ 375/240.28

* cited by examiner

*Primary Examiner*—Chi H. Pham
*Assistant Examiner*—Thai D. Hoang
(74) *Attorney, Agent, or Firm*—Sterne Kessler Goldstein & Fox, p.l.l.c.

(57) ABSTRACT

The present invention is directed to a system and method for demultiplexing video signals that have been combined using a time division multiplexing approach. The system includes synchronizers, parsers, demultiplexers, and an input buffer. Each demultiplexer within the system includes a header detect module, a slot map module, a frame sync module and a packet accept module. The method includes the steps of receiving an input stream that contains data packets for more than one program channel that have been combined in which packet identification (PID) information is used and a time division multiplexing scheme, such as transport stream multiplexing format (TSMF) is used. The PID and slot location for each packet is analyzed. Based on the PID and slot location a packet is either accepted or rejected.

16 Claims, 5 Drawing Sheets

SYSTEM AND METHOD FOR DEMULTIPLEXING VIDEO SIGNALS

BACKGROUND OF THE INVENTION

1. Field of the Invention

The present invention relates to video signal processing, and more particularly, to demultiplexing video signals.

2. Background of Invention

Television systems have become increasingly complex as consumers continue to demand greater functionality and performance from television sets. Furthermore, the geographic diversity and business interests of manufacturers and service providers within the television and recording industries has lead to a plethora of analog and digital video formats. For example, analog video signal formats include National TV System Committee (NTSC), Phase Alternation Line Rate (PAL), and Sequential Couleur Avec Memoire (SECAM) television signals. Example digital video signal formats include ITU-R-656 and Digital Video Interface (DVI).

When program channels are transmitted to customer premise devices, such as a television or cable set top box, data packets for program channels are typically multiplexed together into a video data stream. So, for example, program channels, such as CNN, HBO, and ESPN can be combined into a single data stream. When the video data stream is received by a customer premise device, the customer premise device must be able to discern which packets belong to the program channel of interest (i.e., what channel is to be viewed or recorded).

A common way to identify packets within a video data stream that are associated with a particular program channel uses program identification (PID) information. This approach can be referred to as a PID parsing approach. In this approach, each packet within a video data stream contains a PID that contains information that tells a customer premise device which channel a particular packet of information is associated with.

In another approach, data packets within a video data stream that are associated with a particular program are allocated within particular time slots of a data frame. With this approach a distribution device, such as a cable system headend, organizes data packets into frames with packets for a particular program channel located in specific time slots within the frames. This approach can be referred to as a time division multiplexing approach. An example of this approach is transport stream multiplexing format (TSMF), which has been recently developed by a consortia of television manufacturers for use in Japan. Within this approach it is also common that packets will contain a PID.

What is needed is a system and method for efficiently demultiplexing video signals that use both a PID and are multiplexed using a time division multiplexing approach.

SUMMARY OF THE INVENTION

The present invention is directed to a system and method for demultiplexing video signals that have been combined using a time division multiplexing approach. The system includes synchronizers, parsers, demultiplexers, and an input buffer. Each demultiplexer within the system includes a header detect module, a slot map module, a frame sync module and a packet accept module. The method includes the steps of receiving an input stream that contains data packets for more than one program channel that have been combined in which packet identification (PID) information is used and a time division multiplexing scheme, such as transport stream multiplexing format (TSMF) is used. The PID and slot location for each packet is analyzed. Based on the PID and slot location a packet is either accepted or rejected.

The invention allows efficient demultiplexing of packets within video data input streams that use a time division multiplexing scheme, such as TSMF for packets that have PIDs. As a result, having an approach where the parsing and demultiplexing functions are separate, but can work together provides efficiency advantages and permits designs that only used a PID approach to be updated without significantly disturbing the existing designs.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
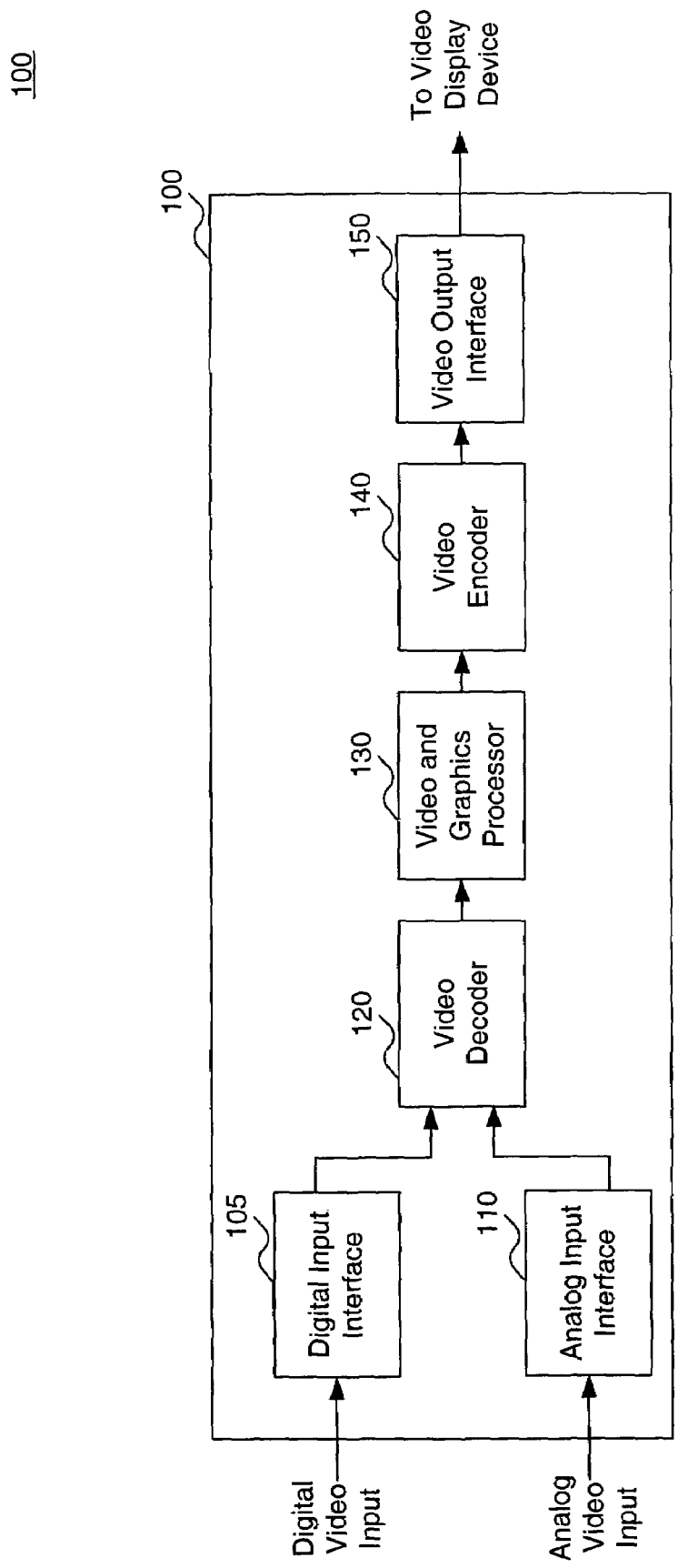
FIG. 1 is a diagram of a video processing system, according to an embodiment of the invention.

FIG. 1 provides a diagram of an example video processing system 100, according to an embodiment of the invention. A video processing system, such as video processing system 100, receives video input streams and manipulates the stream to properly format an output video stream. Video processing system 100 can also integrate graphics and text (e.g., teletext) into the video stream and output a reformatted video stream. A video processing system, such as video processing system 100, will typically be located within a video processing device, such as a television or cable set-top box.

Video processing system 100 includes digital input interface 105, analog input interface 110, video decoder 120, video and graphics processor 130, video encoder 140 and video output interface 150. Digital input interface 105 can receive one or more digital video input streams. Analog input interface 110 can receive one or more analog video input streams. Video decoder 120 can support decoding and encoding of both analog and video input signals, and is coupled to the outputs of digital input interface 105 and analog input interface 110. Video decoder 120 can support high quality decoding of a standard definition analog composite video broadcasting signal (CVBS) and S-Video signals, for example. Similarly video decoder 120 can decode digital video signals that comply with the International Telecommunications Union (ITU) standard ITU-R-656 at varying resolutions including 525i, 625i, and 240p, for example. This video decoding functionality is described by way of example, and not limitation. Decoding of other formats is possible without departing from the spirit and scope of the present invention.

Video and graphics processor 130 includes a variety of functions for processing video and graphics, including integrating video and graphics, and is coupled to the output of video decoder 120. In particular, video and graphics processor 130 can include MPEG graphics and video feeders, video scalers, capture blocks, and video compositors for combining video and graphics.

Video encoder 140 can support both standard and high definition video signals, and is coupled to the output of video and graphics processor 130. For example, video encoder 140 can support a variety of analog video standards (e.g., NTSC, PAL, SECAM, 480i, 480p, 720p, and 1080i), as well as digital video standards (e.g., ITU-R-656 and support for digital video interface (DVI) encoding).

Video output interface 150 can consist of a set of analog and digital output interfaces to support a multitude of video standards, and is coupled to the output of video encoder 140. Video output interface 150 can be coupled to a video processing device, such as a television, a monitor, or a cable set top box to display a video signal or for further processing.

The focus of the present invention relates primarily to components within a digital input interface, such as digital input interface 105. In particular, digital input interface 105 is capable of processing digital input streams in many formats that use a variety of multiplexing schemes. The format and multiplexing scheme can vary by manufacturer and by the location where a video processing device will be used. For example, a television used in Europe may need to be able to process a certain format using a certain multiplexing scheme, whereas a television used in Japan may need to be able to process a different format using a different multiplexing approach.

Regardless of the format, when program channels (e.g., CNN, HBO, ESPN) are multiplexed together a means to identify the individual program channel must exist. For example, when program channels are distributed within a cable television network a cable headend combines programs into one or more video data streams. Each video data stream will consist of several program channels that have been combined into a single video data stream. When these video data streams are received by a television or a cable set top box located at a customer premises, the television or cable set top box must be able to extract the program channel or channels of interest from the video data stream.

A common way to identify data packets within a video data stream that are associated with a particular program channel uses program identification (PID) information. This approach can be referred to as a PID parsing approach. In this approach, each packet within a video data stream contains a PID that contains information that tells a customer premise device which channel a particular packet of information is associated with. For example, a video data stream can contain ten program channels. The data for these channels is contained in packets of information that can arrive in any sequence, but the PIDs are unique to each program channel. A cable headend or other program distribution device must verify that PIDs are unique when gathering program content from many different sources and combining content for program distribution. In some cases because program information is gathered from different sources, PIDs may be duplicated. In these cases, a cable headend must remap the PID information to create unique PID assignments. When the PIDs are unique for each program channel, a digital input interface, such as digital input interface 105, can use PIDs to parse a video data stream to extract the data that is desired.

In another approach, data packets within a video data stream that are associated with a particular program are allocated within particular time slots of a data frame. With this approach a distribution device, such as a cable system headend, organizes data packets into frames with packets for a particular program channel located in specific time slots within the frames. This approach can be referred to as a time division multiplexing approach. An example of this approach is transport stream multiplexing format (TSMF), which has been recently developed by a consortia of television manufacturers for use in Japan. Within this approach it is also common that packets will contain a PID.

Figure 2:
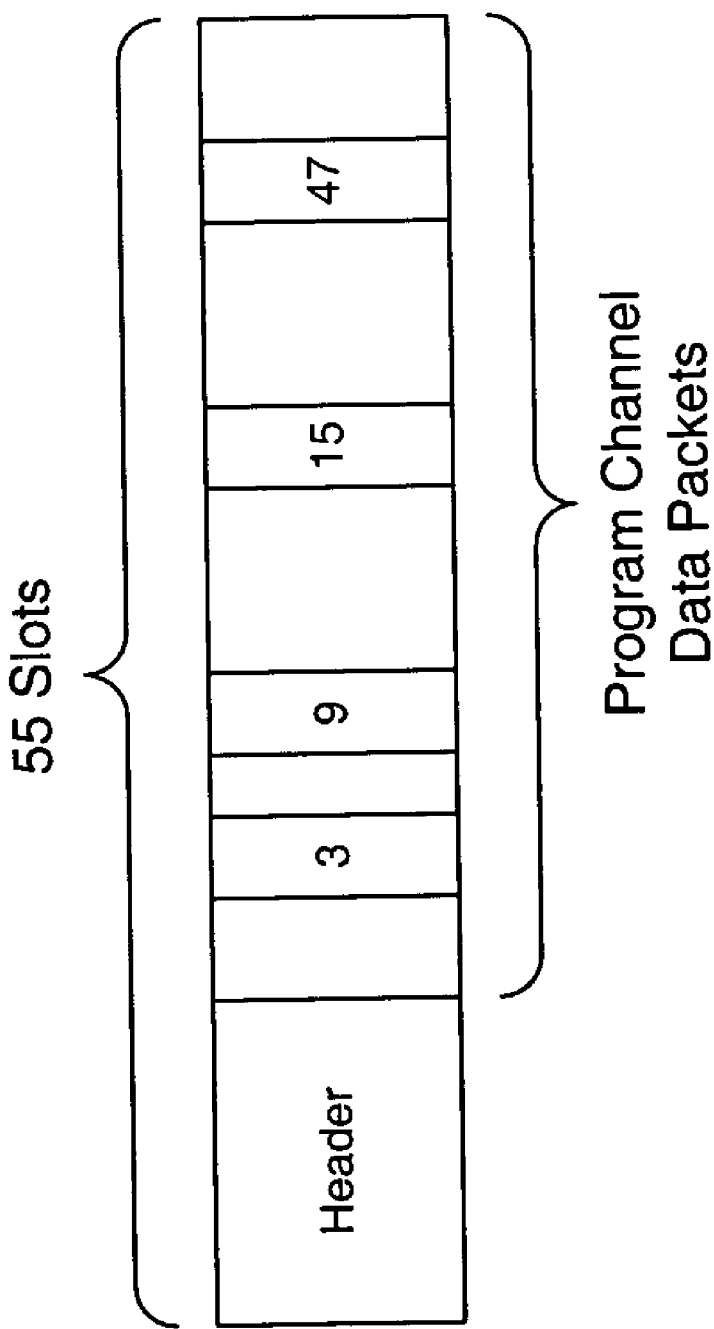
FIG. 2 is a diagram of a time division multiplexing format for a video stream data frame.

FIG. 2 is a diagram of a time division multiplexing format for a video stream data frame. The example format in FIG. 2 provides a frame that includes fifty-five slots for data packets. The first slot in each frame includes header information and the remaining slots include time slots where program channel data packets can be located. Among the information contained in a data packet within a header information slot is the identification of which slots data packets for a particular channel will be located. A frame can have any number of slots. Slot size within a frame will typically be the same. For a particular system, the number of slots within a frame and the slot size will be known to the customer premise device, such as a cable set top box. In one example, frames can be transmitted sequentially by a headend distribution device to customer premise equipment.

Figure 3:
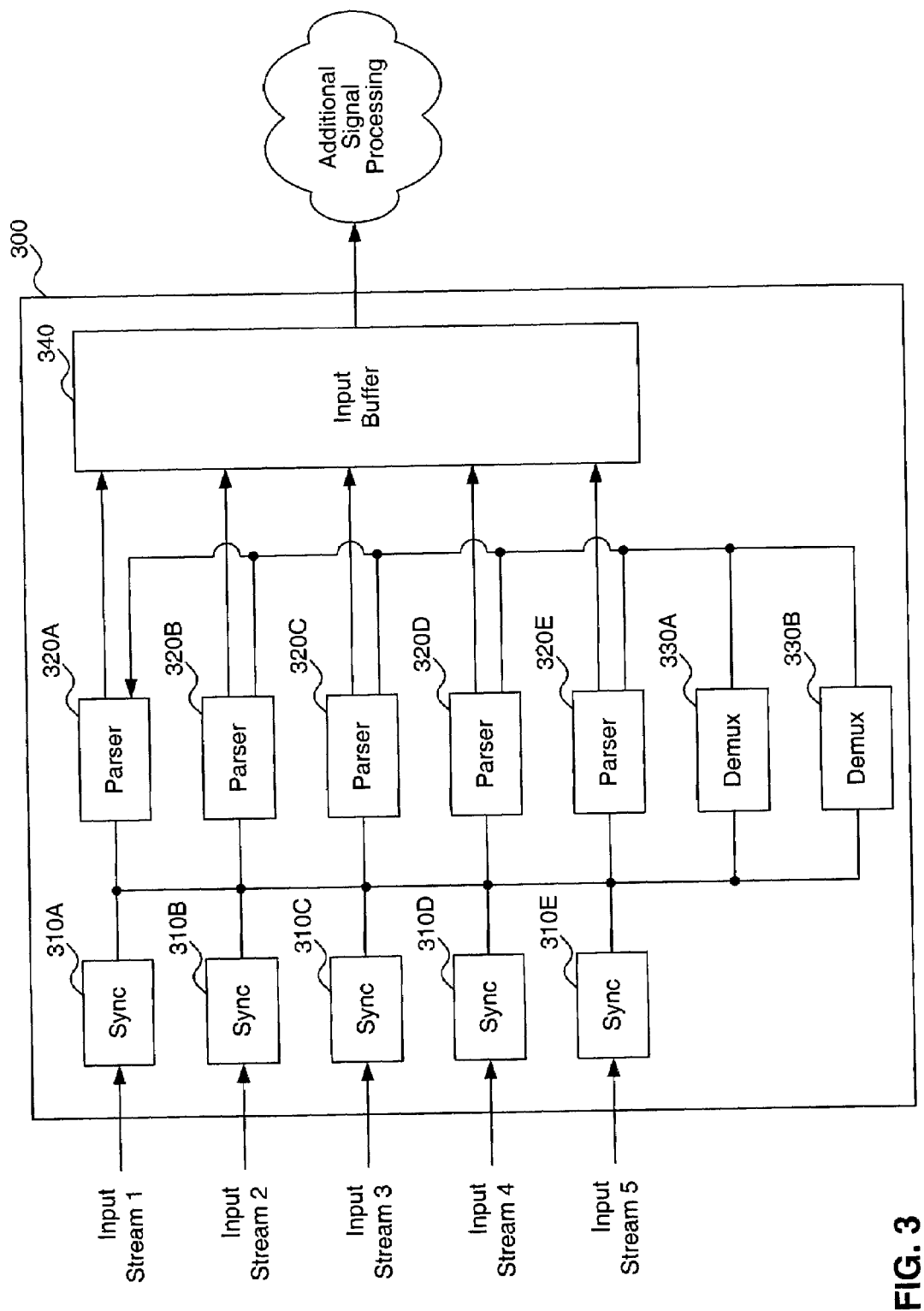
FIG. 3 is a diagram of a video data stream front end processor, according to an embodiment of the present invention.

FIG. 3 is a diagram of video data stream front end processor 300, according to an embodiment of the present invention. In one embodiment, video data stream front end processor 300 can be included in a digital input interface, such as digital input interface 105. Video data stream front end processor 300 includes synchronizers 310A through 310E, parsers 320A through 320E, demultiplexers 330A and 330B, and input buffer 340. As shown in FIG. 3, video data stream front end processor 300 receives five video input streams—input stream 1, input stream 2, input stream 3, input stream 4, and input stream 5. Each input stream can contain video and audio information for multiple program channels. For example, input stream 1 can contain data for ten different program channels, such as CNN, ESPN and HBO.

Synchronizers 310A through 310E convert the clock rate of input streams 1 through 5 to the clock rate of video data stream front end processor 300. Synchronizer 310A receives input stream 1. Synchronizer 310B receives input stream 2. Synchronizer 310C receives input stream 3. Synchronizer 310D receives input stream 4. And, synchronizer 310E receives input stream 5.

Parsers 320A through 320E extract data packets within a video input stream of a particular program channel based on the PID for each data packet. Parsers 320A through 320E also perform various error correction functions and other processing. When a time division multiplexing approach is used, parsers 320A through 320E will receive an input from demultiplexers 330A or 330B that indicates whether a data packet should be accepted or rejected. Each parser is coupled to an output of each of synchronizers 310A through 310E and to each of demultiplexers 330A and 330B.

Demultiplexers 330A and 330B receive video data input streams from synchronizers 310A through 310C. Demultiplexers 330A and 330B determine whether to reject or accept a packet of information based on the location of a packet within the video data input stream. Demultiplexers 330A and 330B are used when a time division multiplexing approach to combining program channel information is used. When demultiplexer 330A or 330B receives a video input stream, demultiplexer 330A or 330B searches for a packet containing header information. Upon identifying a header information packet, a demultiplexer, such as demultiplexer 330A or 330B, determines the subsequent slot locations of packets associated with the program channel of interest (i.e., the program to be viewed or stored to a recording device). Demultiplexer 330A or 330B then monitors the video input stream by counting packet slots that are received. When a packet is received that is located in a slot corresponding to one where program channel of information of interest should be located, a demultiplexer, such as demultiplexer 330A or 330B transmits an accept message to a parser, such as parsers 320A through 320B. Otherwise, following each data packet received by demultiplexer 330A or 330B, the demultiplexer will transmit a reject message to a parser. Overall system control coordinates which parsers and demultiplexers will be active at any given time. Overall system control also provides instructions such that a demultiplexer knows to which parser to send an accept or reject message.

Input buffer 340 receives data packets from parsers 320A through 320E that correspond to a program channel of interest. Input buffer 340 then transmits the data packets for further signal processing within digital input interface 105 and other components of video processing system 100.

The specific number of synchronizers, parsers and demultiplexers can vary depending on the number of video input streams and the number of tuners. Specifically, the number of synchronizers and parsers will be a function of the number of video input streams. The number of demultiplexers will be a function of the number of tuners. For example, in a television that contains the ability to simultaneously display one channel, while recording another channel, a minimum of two demultiplexers will be needed—provided that a time division multiplexing approach is used to combine program data. In some instances, which has historically been the case in the United States a time division multiplexing approach will not be used, so no demultiplexers may be needed.

Furthermore, in another embodiment the functionality associated with demultiplexers 330A and 330B can be integrated into parsers 320A through 320E. However, using a time division multiplexing approach, such as TSMF is new and less common than only using PID processing. As a result, having an approach where the parsing and demultiplexing functions are separate, but can work together provides efficiency advantages and permits designs that only used a PID approach to be updated without significantly disturbing the existing design of parsers and video data stream front end processors.

Figure 4:
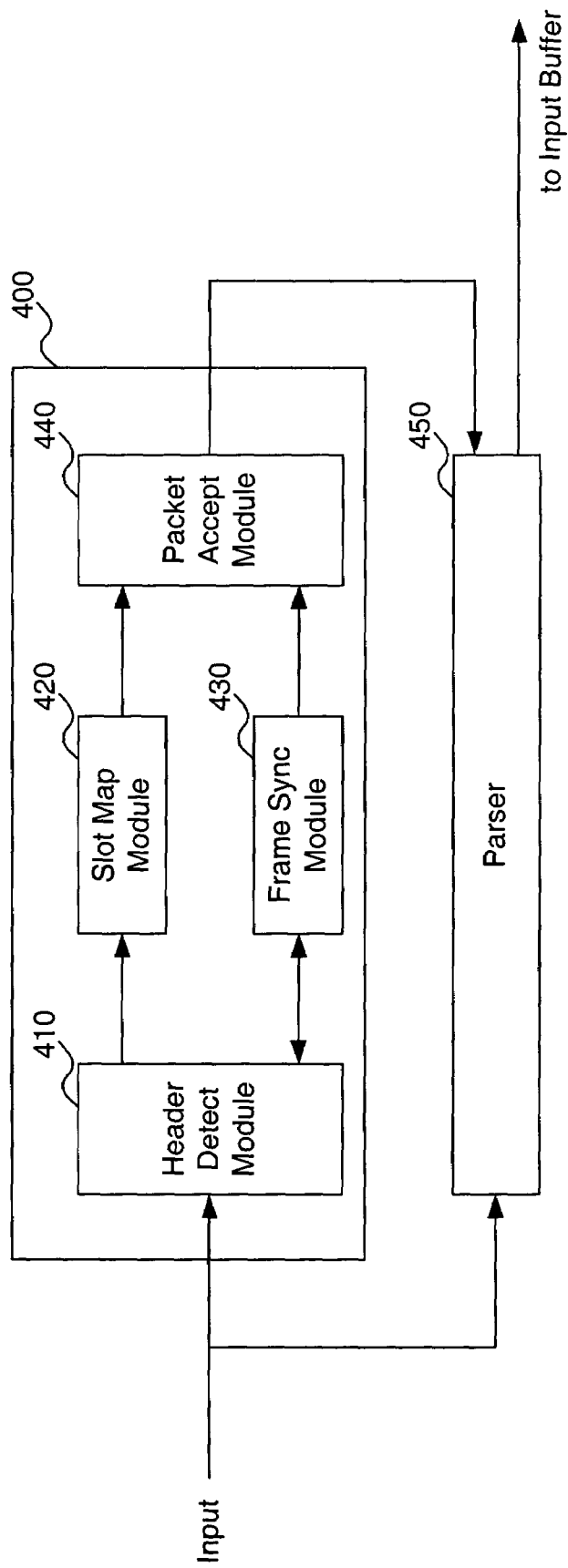
FIG. 4 is a diagram of a video stream demultiplexer, according to an embodiment of the present invention.

FIG. 4 is a diagram of video stream demultiplexer 400, according to an embodiment of the invention. Video stream demultiplexer 400 includes a header detect module 410, slot map module 420, frame sync module 430 and packet accept module 440.

Header detect module 410 receives a video data input stream, and detects header information. Header detect module 410 has its output coupled to slot map module 420 and frame sync module 430.

Slot map module 420 receives header information from header detect module 410, and creates a slot map that identifies which slots contain packets of information for a program channel of interest. The slot map can be generated automatically by the hardware for instantaneous changes or updated by software if specifications change.

Frame sync module 430 monitors the incoming input stream to ensure that video stream demultiplexer 400 remain in synchronization with the incoming input stream, and provides an indication of which slot is currently being received to packet accept module 440.

Packet accept module 440 is coupled to slot map module 420 and frame sync module 430. Packet accept module 420 determines whether to transmit an accept or reject message to a parser, such as parser 450. Packet accept module 440 makes this determination based on information received from slot map module 420 that identifies in which slots packets of interest will be located and by receiving information from frame sync module 430 that identifies the particular slot which is currently being received. If the packet being received is in a slot identified as one carrying program channel information of interest, an accept message is generated. Otherwise, a reject message is generated. Also, if an error condition exists (e.g., frame synchronization is lost), a reject message will be sent to a parser, such as a parser 450.

Figure 5:
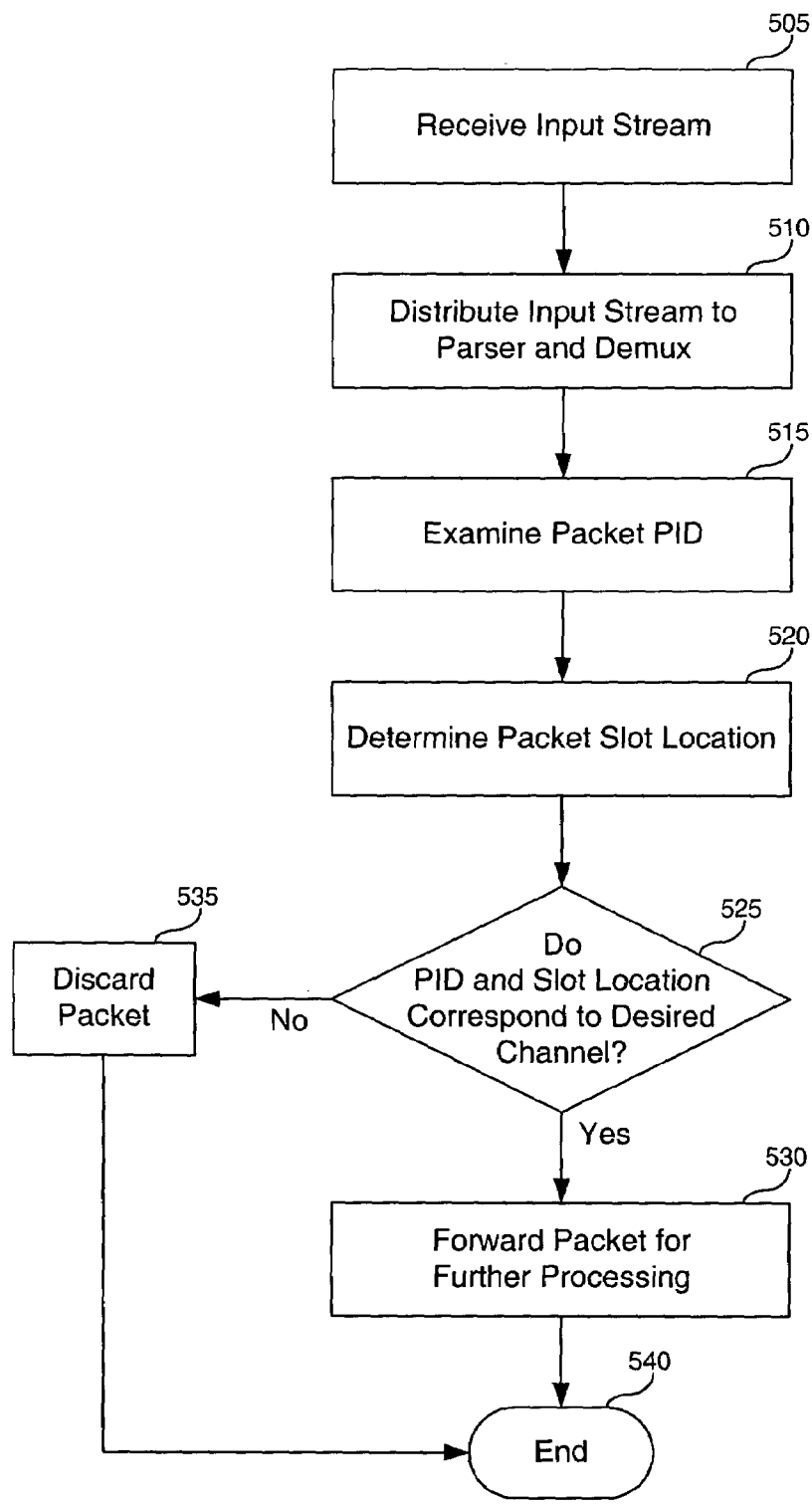
FIG. 5 is a flowchart of a video data stream demultiplexing method, according to an embodiment of the invention.

FIG. 5 is a flow chart of video data stream demultiplexing method 500, according to an embodiment of the invention. Method 500 begins in step 505. In step 505, a video data input stream is received. For example, a video data stream front end processor, such as video data stream front end processor 300 can receive an input stream, such as input stream 1.

In step 510, the video data input stream is distributed to a parser and a demultiplexer. For example, a video input stream, such as input stream 1, can be distributed to a parser, such as parser 320A and to a demultiplexer, such as demultiplexer 330A.

In step 515, a packet PID is examined. For example, parser 320A can examine a PID of a packet contained within video input stream 1. In step 520, the slot location for the received packet is determined. For example, demultiplexer 330A can determine the slot location for a received packet within a particular frame when a time division multiplexing approach is used. In one embodiment, steps 515 and step 520 will occur in parallel.

In step 525, a decision is made whether the PID corresponds to the program channel of interest and whether the packet of information is located in a slot within a frame corresponding to a program channel of interest. In one example, a parser, such as parser 320A decides whether the PID corresponds to the program channel of interest. The parser also receives either an accept or reject message from a demultiplexer, such as demultiplexer 330A. For example, demultiplexer 330A will transmit an accept message if the packet is located in a slot corresponding to the program channel of interest. Demultiplexer 330A will transmit a reject message if the packet is located in a slot not corresponding to the program channel of interest. If the PID and slot correspond to a program channel of interest, then method 500 proceeds to step 530. In step 530, the received packet is forwarded for further processing. Method 500 proceeds to step 540 and ends.

If the PID or slot do not correspond to a program channel of interest, then method 500 proceeds to step 535. In step 535, the received packet is discarded, and method 500 proceeds to step 540 and ends. Method 500 will repeat as each packet within a video data stream is received.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A video data stream front end processor for receiving video data input streams that use a time division multiplexing approach to combine program channel packets for multiple program channels, comprising:
   a plurality of synchronizers that receive video data input streams containing program channel packets and synchronize a clock rate of the video data input streams to a clock rate of said video data stream front end processor;
   a plurality of parsers coupled to said plurality of synchronizers that extract program channel packets for program channels of interest; and
   a plurality of demultiplexers that receive one or more video data input streams from said plurality of synchronizers with an output of each of said demultiplexers coupled to each of said plurality of parsers;
   wherein a demultiplexer within said plurality of demultiplexers transmits an accept message to a parser within said plurality of parsers when a program channel packet is received in a frame slot within a video data input stream where program channel information of interest is located.

2. The video data stream front end processor of claim 1, further comprising an input buffer for receiving program channel packets from said plurality of parsers.

3. The video data stream front end processor of claim 1, wherein the time division multiplexing approach is transport stream multiplexing format (TSMF).

4. The video data stream front end processor of claim 1, wherein a demultiplexer within said plurality of demultiplexers transmits a reject message to a parser within said plurality of parsers when a program channel packet is received in a slot within a frame within the video input stream where program channel information of interest is not located.

5. The video data stream front end processor of claim 1, wherein a demultiplexer within said plurality of demultiplexers and a parser within said plurality of parsers process a video data input stream in parallel.

6. A method for demultiplexing a video data input stream to obtain program channel information of interest, wherein the video data input stream contains packets of information for more than one program channel in which a time division multiplexing approach was used to combine packets for the more than one program channel, comprising the steps of:
   (a) receiving the video data input stream;
   (b) distributing the video input stream to at least one parser and a demultiplexer;
   (c) examining within the at least one parser packet identification (PID) information for a packet in the video data input stream;
   (d) determining within the demultiplexer a slot location for the packet; and
   (e) determining within the at least one parser how to process the packet based on the PID examined in step (c) and the slot location determined in step (d).

7. The method of claim 6, wherein step (e) further comprises rejecting the packet if the PID does not correspond to the program channel of interest.

8. The method of claim 6, wherein step (e) further comprises rejecting the packet if the packet is in a slot location that does not correspond to the program channel of interest.

9. The method of claim 6, wherein step (e) further comprises accepting the packet if the PID corresponds to the program channel of interest and if the packet is in a slot location that corresponds to the program channel of interest.

10. The method of claim 6, wherein steps (b) and (c) occur in parallel.

11. The method of claim 6, wherein the time division multiplexing approach uses a transport stream multiplexing format (TSMF).

12. A video data stream front end processor for receiving video data input streams that use a time division multiplexing approach to combine program channel packets for multiple program channels, comprising:
   a plurality of synchronizers that receive video data input streams containing program channel packets and synchronize a clock rate of the video data input streams to a clock rate of said video data stream front end processor;
   a plurality of parsers coupled to said plurality of synchronizers that extract program channel packets for program channels of interest; and
   a plurality of demultiplexers that receive one or more video data input streams from said plurality of synchronizers with an output of each of said demultiplexers coupled to each of said plurality of parsers;
   wherein a demultiplexer within said plurality of demultiplexers transmits a reject message to a parser within said plurality of parsers when a program channel packet is received in a slot within a frame within the video input stream where program channel information of interest is not located.

13. The video data stream front end processor of claim 12, further comprising an input buffer for receiving program channel packets from said plurality of parsers.

14. The video data stream front end processor of claim 12, wherein the time division multiplexing approach is transport stream multiplexing format (TSMF).

15. The video data stream front end processor of claim 12, wherein a demultiplexer within said plurality of demultiplexers transmits an accept message to a parser within said plurality of parsers when a program channel packet is received in a frame slot within a video data input stream where program channel information of interest is located.

16. The video data stream front end processor of claim 12, wherein a demultiplexer within said plurality of demultiplexers and a parser within said plurality of parsers process a video data input stream in parallel.

* * * * *